United States Patent
Boksjo et al.

[11] 3,865,438
[45] Feb. 11, 1975

[54] PROTECTION MEANS AGAINST AUTO-IGNITION FOR THE RECTIFIERS OF A STATIC CONVERTER

[75] Inventors: Carl Ingvar Boksjo; Karl Erik Olsson, both of Ludvika, Sweden

[73] Assignee: Allmanna Svenska Elektriska Aktiebolaget, Vasteras, Sweden

[22] Filed: Feb. 2, 1970

[21] Appl. No.: 7,843

[30] Foreign Application Priority Data
Feb. 14, 1969  Sweden................................ 2025/69

[52] U.S. Cl........................... 321/13, 321/11, 321/38
[51] Int. Cl. ............................................. H02m 1/18
[58] Field of Search ............................... 321/11–13, 321/38; 315/252, 268, 349, 148; 307/252.54

[56] References Cited
UNITED STATES PATENTS
3,474,321  10/1969  Ainsworth............................. 321/38
3,541,423  11/1970  Kelley................................... 321/13

FOREIGN PATENTS OR APPLICATIONS
180,681  10/1966  Syria..................................... 321/12

OTHER PUBLICATIONS
IEEE Transactions On Power Apparatus and Systems, "A Method to Detect the Deionization Margin Angle and to Prevent the Commutation Failure of an Inverter for DC Transmission," Vol. Pas–86, No. 3, pp. 259–262, March 1967.

*Primary Examiner*—William H. Beha, Jr.

[57] ABSTRACT

In a static converter with thyristor-rectifiers, a protection against auto-ignition includes an arrangement for sensing the polarity over the rectifier, and an And-gate. The sensing arrangement emits a first signal to the And-gate when a voltage after a commutation becomes negative and a second signal when a voltage after a commutation becomes positive. The And-gate is connected to the ignition system of the rectifiers to supply both signals thereto. The connecting means for the first signal includes a delay device which delays the signal by a time corresponding to the longest recovery time for the thyristors, so that, if the second signal is emitted during this time, an ignition signal is allowed to pass the And-gate.

5 Claims, 3 Drawing Figures

PROTECTION MEANS AGAINST AUTO-IGNITION FOR THE RECTIFIERS OF A STATIC CONVERTER

BACKGROUND OF THE INVENTION

1. Field of the Invention

The present invention relates to a static converter having thyristor-rectifiers and the invention concerns a protection means in this static converter to prevent auto-ignition of the thyristors.

In its most simple embodiment the invention provides protection against auto-ignition of the rectifiers in inverter operation in cases when the commutation margin is too small, but by further development of the idea of the invention it is also possible to protect thyristors in rectifier operation, for instance when, after overloading due to a short-circuit, the thyristors have abnormal recovery time so that there is a risk of auto-ignition 2. The Prior Art In inverter operation the commutations for the various rectifiers must be initiated so early, i.e., with such a small delay angle, that the required commutation margin is obtained to prevent reignition of a rectifier when its commutation voltage alters polarity, the rectifier then having positive anode voltage. With a mercury arc rectifier the rectifier must be deionised during the commutation margin, whereas with thristor rectifiers the separate thristors must recover in order to acquire their voltage strength in the conducting direction. The commutation must therefore be initiated so early that the required commutation margin is obtained not only under normal conditions but also when such disturbances arise in the commutation voltage that this alters polarity earlier than calculated or that the commutation is finished later than calculated. In both cases the commutation margin is decreased. Seen from the safety point of view it is thus desirable to calculate with a large commutation margin.

On the other hand increased commutation margin incurs increased reactive power in the inverter, and it is therefore desirable to have as small a commutation margin as possible. The choice of the commutation margin is therefore a compromise between these two requirements.

Although a reignition of a mercury arc rectifier only causes a relatively harmless distrubance, the situation with thyristor-rectifiers is more complicated and a reignition may involve considerable risks for the thyristor-rectifier. When construction a thristor-rectifier thyristors are preferably chosen which are as alike as possible with respect to their various properties, but however carefully they are selected a group of thyristors can nver be obtained which are identical in all respects, and thus not with respect to the recovery time either. Thus, when programming the commutation margin control for the inverter, for example in accordance with U.S. Pat. No. 2,774,012, the commutation margin control must be chosen so that even the slowest thyristors in each rectifier have time to recover before the voltage across the rectifier becomes positive in the conducting direction.

Usually it is also possible with the commutation margin control to take into account disturbances which occur before the start of the commutation, whereas after this moment it is impossible to predict disturbances and therefore they cannot be taken into consideration in time. The following three possibilities may arise during operation of an inverter having thyristor-rectifiers:

1. Under normal conditions all thyristors in a rectifier have time to recover during the commutation margin so that the voltage strength of the rectifier has been regained when the voltage over the rectifier becomes positive.
2. If such a disturbance occurs in the commutation voltage that the voltage across the rectifier becomes positive before any of the thyristors have had time to recover, all thyristors will reignite which causes a harmless arc-through which may be compared with the situation for mercury arc rectifiers.
3. If, however, the voltage across the rectifier becomes positive after only a few of the thyristors have recovered, the remaining thyristors will reignite and the first-mentioned thyristors will therefore take up the entire voltage in the conducting direction of the rectifier. If these thyristors are few this may cause auto-ignition and the thyristors may be destroyed.

SUMMARY OF THE INVENTION

The idea of the present invention is to prevent such auto-ignition of a few of the thyristors and this is done if there is a positive rectifier voltage during the critical interval in the third case, simply by giving an ignition impulse to all thyristors in the rectifier and in this way inducing a safe arc-through in the rectifier. Such a protection means against auto-ignition is constructed in accordance with the enclosed claims.

It must also be mentioned that the recovery time of the thyristors make the signal delay in the time device dependent on the load of the converter so that the fact that the critical interval increases in length with increased load or temperature is taken into consideration.

Thus a protection is also obtained against disturbances in the form of a short-circuit in rectifier operation when the recovery time of some of the thyristors may become critical in length.

BRIEF DESCRIPTION OF THE DRAWING

The invention will be further described with reference to the accompanying drawing where FIG. 1 shows a conventional static converter whereas

DESCRIPTION OF THE PREFERRED EMBODIMENTS

Figure 1:
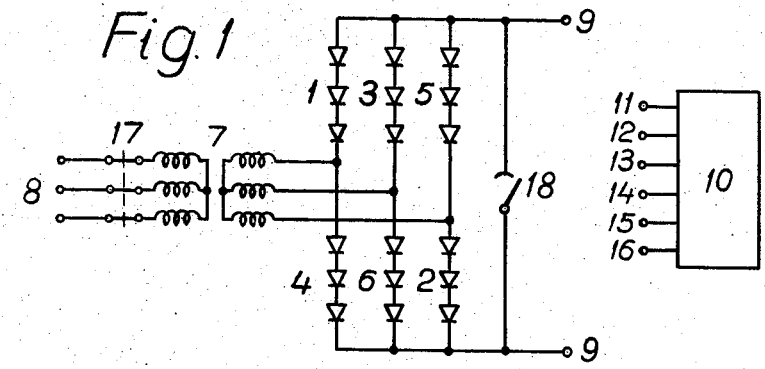

FIG. 1 shows a static converter having a rectifier bridge with six thyristor-rectifiers 1 – 6, a converter-transformer 7, AC terminals 8 and DC terminals 9. The rectifiers are controlled by a control device 10 of conventional type having output 11 – 16, from which control pulses are fed to the thyristors in the rectifiers, as can be seen in more detail in FIG. 3. The converter is provided with a breaker 17 on the AC side.

Figure 2:
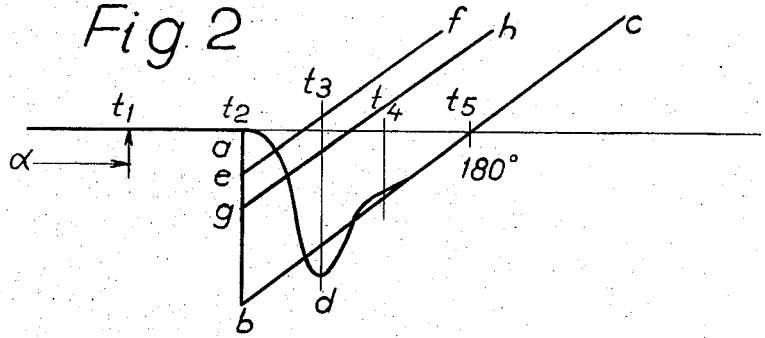
FIG. 2 shows the voltage conditions of a rectifier before, during and after commutation during inverter operation.

FIG. 2 shows the voltage across a rectifier in inverter operation before, during and after the commutation. During the conducting interval of the rectifier and also during the commutation, the voltage across the rectifier is almost zero in comparison with the voltage across the rectifier when it is blocked. When the commutation finishes the voltage anode-cathode is negative and changes polarity a short while afterwards to become positive. In FIG. 2 the commutation is initiated at the moment $t_1$ with a delay angle $\alpha$ which is selected so that the sum of this and the commutation time is less than 180° with the desired commutation margin. The control device 10 may for this purpose include a means for commutation margin control according to U.S. Pat. No. 2,774,012 and British Pat. No. 985,674.

The time $t_1 - t_2$ indicates the commutation time and at the end of the commutation the voltage across the rectifier will in theory follow the curve $abc$, that is, it will be first negative, decrease to zero at the moment $t_5$, corresponding to the angle 180°, and then become positive. However, in practice the voltage does not drop instantaneously to its negative value but follows the curve $ad$ since the thyristors are not blocked simultaneously or instantaneously in the inverse direction.

However, the thyristors need considerably longer time to recover their strength to voltages in the forward direction since they contain a number of free charge-carriers which must first be recombined or sucked out to the blocking junctions in the thyristor. Thus, for example $t_4$ is the first point at which all the thyristors can be assumed to have recovered so that they are ready to take up voltage in the conducting direction. This must therefore be taken into consideration when calculating the necessary commutation margin, for example in accordance with U.S. Pat. No. 2,774,012.

It is clear that if the commutation is finished at $t_2$ and the rectifier voltage follows the curves $adc$, everything is all right. However, if the commutation is delayed so that the curve $ad$ is displaced to the right, the moment $t_4$ may lie to the right of $t_5$, in which case the conditions may be critical. Such a delay may be caused by a voltage drop in the AC network connected to the terminals 8 in FIG. 1, the commutation voltage which is the driving force for the commutation then decreasing, or the delay may be caused by disturbances in the DC circuit.

In FIG. 2 this has been illustrated by displacing the voltage curve bc to the left so that the voltage may be imagined to follow the curve $aef$ or $agh$. If the voltage follows the curve $aef$ it will become positive after such a short time that presumably none of the thyristors will have reached blocking state and thus the whole thyristor-rectifier will reignite. A regular arc-through is thus obtained which causes disturbance in the converter operation but, as mentioned previously, such disturbances in an inverter are relatively harmless and of a temporary nature.

If, on the other hand, the voltage follows the curve $agh$ it will have been negative for so long that some of the thyristors will have recovered whereas others will reignite for the growing positive voltage. This will therefore only lie over the thyristors which have recovered and these will therefore probably auto-ignite which may very easily mean that they are destroyed and after the next commutation there is a risk that the rest of the thyristors will be destroyed.

Figure 3:
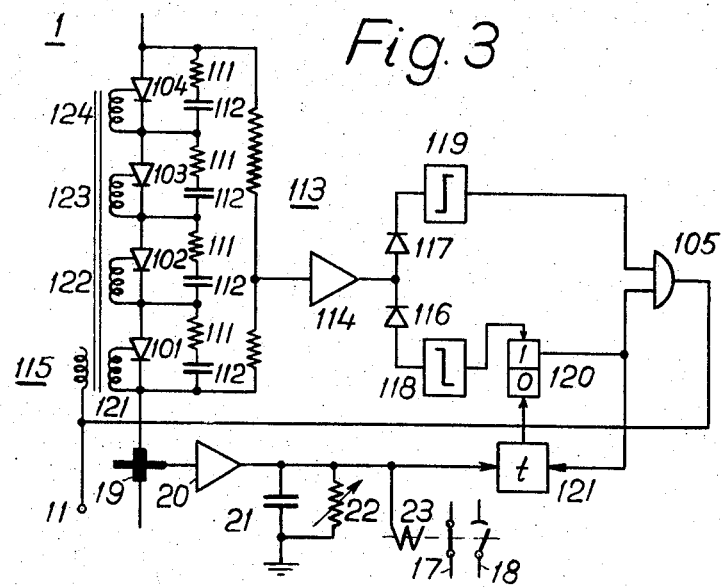
FIG. 3 shows a thyristor-rectifier for a static converter according to FIG. 1 including the protection according to the invention.

It can thus be seen that the critical interval for the occurrence of positive voltage is substantially just before $t_4$ and according to the invention the thyristors are protected by allowing a positive rectifier voltage within this interval to cause controlled ignition of all the thyristors, as shown in FIG. 3.

FIG. 3 shows one of the thyristor rectifiers in FIG. 1, for example the rectifier 1, comprising a plurality of series-connected thyristors 101–104 parallel connected with a voltage-divider comprising resistors 111 and capacitors 112. The rectifier is controlled by the control device 10 in FIG. 1 through the terminal 11. The transmission of control pulses to the thyristors is shown symbolically in FIG. 3 as a control pulse transformer 115 provided with secondary windings 121–124 connected to the control electrodes of the thyristors 101–104. The transmission of control pulses to the thyristors may also be carried out by light impulses. In parallel with the whole rectifier is an extra voltage-divider 113 and from this the voltage over the rectifier is taken out and influences two parallel circuits through an amplifier 114.

These two parallel circuits contain individual voltage level discriminators 118, 119, for example in the form of impulse transformers connected to the amplifier 114 through reverse parallel diodes 116, 117, respectively. In this way 118 will indicate negative voltage across the anode-cathode of the rectifier and 119 will indicate positive rectifier voltage and by insertion of the amplifier 114 these indications are obtained at the same instant as the voltage changes polarity.

The discriminator 118 is connected to a bistable circuit 120, the output side of which is connected to an And-gate 105 and also to a time device 121 which is arranged for resetting of the bistable circuit 120. The signals from 119 and 120 are both connected to the And-gate 105, the output side of which is connected to the transformer 115.

Under normal conditions when the rectifier voltage follows the curve $abc$, or rather $adc$, 118 emits a signal to 120 at about the moment $t_2$, and this signal is maintained by the bistable circuit 120 until about $t_4$ when the time device 121 returns the circuit to zero position. The discriminator 119 emits a signal at the moment $t_5$, at which moment the signal from 120 has ceased and nothing happens since there is no overlap of the input signals to 105.

If, however, a disturbance causes the rectifier voltage to follow one of the curves $agh$ or $aef$, the signal from 119 will arrive before the moment $t_4$, which causes overlapping of the signals to 105 which will therefore emit a signal to 115 and the rectifier ignites. In the latter case, that is when the voltage follows the curve $aef$ such an ignition signal is in fact superfluous, as is clear from the above, since the rectifier will in any case arc-through. On the other hand it does no harm and furthermore increases the safety of the rectifier.

The recovery time of the thyristors increases sharply with the temperature of the thyristors, this in turn being dependent on the load, that is the loss power in the thyristors, and on the cooling of the thyristors. It is thus advisable to design the time device 121 with adjustable delay depending on said factors.

This is done with the help of the members 19 – 22. With the help of transductor 19 or some other type of current indicator the rectifier current and the signal for this are supplied to an amplifier 20 which is calibrated taking into consideration the forward voltage drop in the thyristor-rectifier. The output signal from 20 in the form of a charging current to a capacitor 21 will thus correspond to the dissipation power developed in the thyristors. The capacitor 21 is provided with an adjustable discharge resistor 22 which is set in accordance with the cooling of the thyristors. The discharge current in 22 will thus correspond to the heat cooled away from the thyristors. The capacitor 21 will thus function as an integrating member so that the voltage across the capacitor 22 always indicates the difference between developed and cooled-off heat in the thyristors and with proper dimensions for the different components this voltage will also provide a guage of the temperature in the thyristors. This voltage is connected to the time delay device 121 which is set so that the time delay will be proportional to, or at least follow, said voltage and thus the temperature of the thyristors. In this way the protection means will follow the variations in the recovery time of the thyristors at varying load and temperature.

The protection means may also be included in a protection means for short-circuiting currents in the converter when this is operating as rectifier. As with converters having mercury rectifiers, such a short-circuit protection means normally consists of a blocking device which disconnects the control pulses of the rectifiers so that the rectifiers are blocked one after the other. With thyristor-rectifiers, however, a short-circuiting current often causes such heating of the thyristors that a blocking may be difficult to effect. As described above for inverter operation, an arc-through can then be obtained which damages the rectifier. The device described above protects against this if the breaker 17 is triggered simultaneously. This may be done by connecting a maximum voltage relay 23 to the voltage across the capacitor 21.

Thus upon an over-current or a short-circuit, the voltage across the capacitor 21 increases, soon causing a continuous arc-through of the rectifiers so that these function as uncontrolled diodes until the relay 23 breaks 17 and closes 18 so that the rectifiers become currentless (FIG. 1).

The sensing of the short-circuiting current and triggering of the breaker may of course be carried out in conventional manner independent of the arc-through protection means of the rectifier.

We claim:

1. Static converter having thyristor-rectifiers, each rectifier of the converter being provided with a protection means against auto-ignition comprising a means sensing the polarity of the voltage over the rectifier, an And-gate, said sensing means including means to emit a first signal to said And-gate when the voltage after a commutation becomes negative and a second signal when the voltage after a commutation becomes positive, means connecting the And-gate to the ignition system of said rectifier to supply both signals thereto, the connecting means for the first signal including a delay device which delays the signal a certain predetermined time corresponding to the longest recovery time for said thyristors of the rectifier so that if the second signal is emitted during this time an ignition signal is allowed to pass the And-gate.

2. Static converter according to claim 1, in which said means for sensing the polarity of the voltage over the rectifier comprises two voltage level discriminators arranged in parallel, one for negative and the other for positive polarity, a voltage divider, input sides of said discriminators being connected to said voltage divider over said rectifier and their output sides being connected to said And-gate, the first discriminator being provided on the output side with said delay device.

3. Static converter according to claim 2, in which said delay device is combined with a member for indicating the load condition of the converter, said member influencing the delay device so that its signal delay increases with increased load.

4. Static converter according to claim 3, in which the output signal of said indicating member is a function of the power loss developed in the thyristors and of the temperature of the thyristors.

5. Static converter according to claim 3, in which the converter is provided with disconnection means controlled by said indicating member in such a way that an output signal corresponding to a signal delay of a certain length causes the converter to be disconnected.

* * * * *